United States Patent
Ghare et al.

(10) Patent No.: US 10,447,772 B2
(45) Date of Patent: *Oct. 15, 2019

(54) MANAGED FUNCTION EXECUTION FOR PROCESSING DATA STREAMS IN REAL TIME

(71) Applicant: Amazon Technologies, Inc., Seattle, WA (US)

(72) Inventors: Gaurav D. Ghare, Seattle, WA (US); Roger Shane Barga, Woodinville, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/179,339

(22) Filed: Nov. 2, 2018

(65) Prior Publication Data

US 2019/0082005 A1    Mar. 14, 2019

Related U.S. Application Data

(63) Continuation of application No. 15/084,347, filed on Mar. 29, 2016, now Pat. No. 10,122,788.

(51) Int. Cl.
*H04L 29/08* (2006.01)
*G06F 16/2455* (2019.01)
(Continued)

(52) U.S. Cl.
CPC ........ *H04L 67/10* (2013.01); *G06F 16/24568* (2019.01); *G06F 16/27* (2019.01); *H04L 65/4069* (2013.01)

(58) Field of Classification Search
CPC ........................... G06F 17/30516; H04L 67/10
See application file for complete search history.

(56) References Cited

U.S. PATENT DOCUMENTS 7,310,638 B1 *  12/2007  Blair ................. G06F 16/24568
9,276,959 B2    3/2016   Theimer et al.
(Continued)

FOREIGN PATENT DOCUMENTS

WO         2015070239         5/2015

OTHER PUBLICATIONS

U.S. Appl. No. 14/077,158, filed Nov. 11, 2013, Marvin Michael Theimer, et al.
(Continued)

*Primary Examiner* — Lashonda T Jacobs
(74) *Attorney, Agent, or Firm* — Robert C. Kowert; Meyertons, Hood, Kivlin, Kowert & Goetzel, P.C.

(57) ABSTRACT

Managed function execution for processing data streams in real time may be. A function that describes one or more operations to be performed with respect to one or more data streams may be received via programmatic interface for a managed stream processing system. Stream processing nodes capable of applying the function may be determined and execution of the one or more operations may be initiated at the stream processing nodes as data records of the data stream are received. Results of the application of the processing function may be provided to one or more destinations specified for the function. Performance metrics may also be collected for the execution of the function and provided to a client that submitted the function.

20 Claims, 11 Drawing Sheets

(51) Int. Cl.
*H04L 29/06* (2006.01)
*G06F 16/27* (2019.01)

(56) References Cited

U.S. PATENT DOCUMENTS

| | | | | |
|---|---|---|---|---|
| 2012/0078951 | A1* | 3/2012 | Hsu | G06F 16/24568 707/769 |
| 2013/0046811 | A1* | 2/2013 | Park | H04L 65/605 709/203 |
| 2013/0254771 | A1* | 9/2013 | Musayev | G06F 9/4843 718/101 |
| 2013/0275452 | A1 | 10/2013 | Krishnamurthy et al. | |
| 2013/0311444 | A1* | 11/2013 | Samwel | G06F 16/245 707/714 |
| 2013/0318034 | A1* | 11/2013 | Bawa | G06F 16/283 707/602 |
| 2015/0134626 | A1* | 5/2015 | Theimer | G06F 11/1469 707/693 |
| 2015/0135255 | A1* | 5/2015 | Theimer | H04L 63/20 726/1 |
| 2015/0310069 | A1* | 10/2015 | Milby | G06F 16/2282 707/722 |
| 2016/0026530 | A1* | 1/2016 | Krishnamurthy | H04L 67/1097 714/18 |
| 2016/0132560 | A1* | 5/2016 | Han | G06F 16/24568 707/722 |
| 2017/0091305 | A1* | 3/2017 | Cao | G06F 16/285 |
| 2017/0161333 | A1* | 6/2017 | Chen | G06F 16/2453 |
| 2017/0223075 | A1* | 8/2017 | Hong | G06F 8/65 |

OTHER PUBLICATIONS

International Search Report and Written Opinion from PCT/US2017/024793, dated Jun. 27, 2017, Amazon Technologies, Inc., pp. 1-11.

* cited by examiner

MANAGED FUNCTION EXECUTION FOR PROCESSING DATA STREAMS IN REAL TIME

This application is a continuation of U.S. patent application Ser. No. 15/084,347, filed Mar. 29, 2016, which is hereby incorporated by reference herein in its entirety.

BACKGROUND

Interconnected devices, such as networked sensors and computing devices, can generate and send data pertinent to various operations, transactions, or other events to remote devices for storage and further analysis. For example, mobile phones can generate data indicating their locations, the applications being used by the phone users, and so on, at least some of which can be collected and analyzed in order to present customized coupons, advertisements and the like to the users. The analysis of data collected by surveillance cameras may be useful in preventing and/or solving crimes, and data collected from sensors embedded at various location within airplane engines, automobiles or complex machinery may be used for various purposes such as preventive maintenance, improving efficiency and lowering costs.

Large amounts of such data may be generated and sent in streaming fashion so that the data can be captured in real time. However, over time the volume of streaming data may prove difficult to efficiently analyze. Different data formats for data records within data streams could require different operations to be performed in order to interpret or manipulate the data, making it difficult to utilize a common schema to handle multiple data streams. The volume of data within a data stream may change over time, complicating efforts to acquire the appropriate number of resources for efficiently analyzing the data stream.

Figure 1:
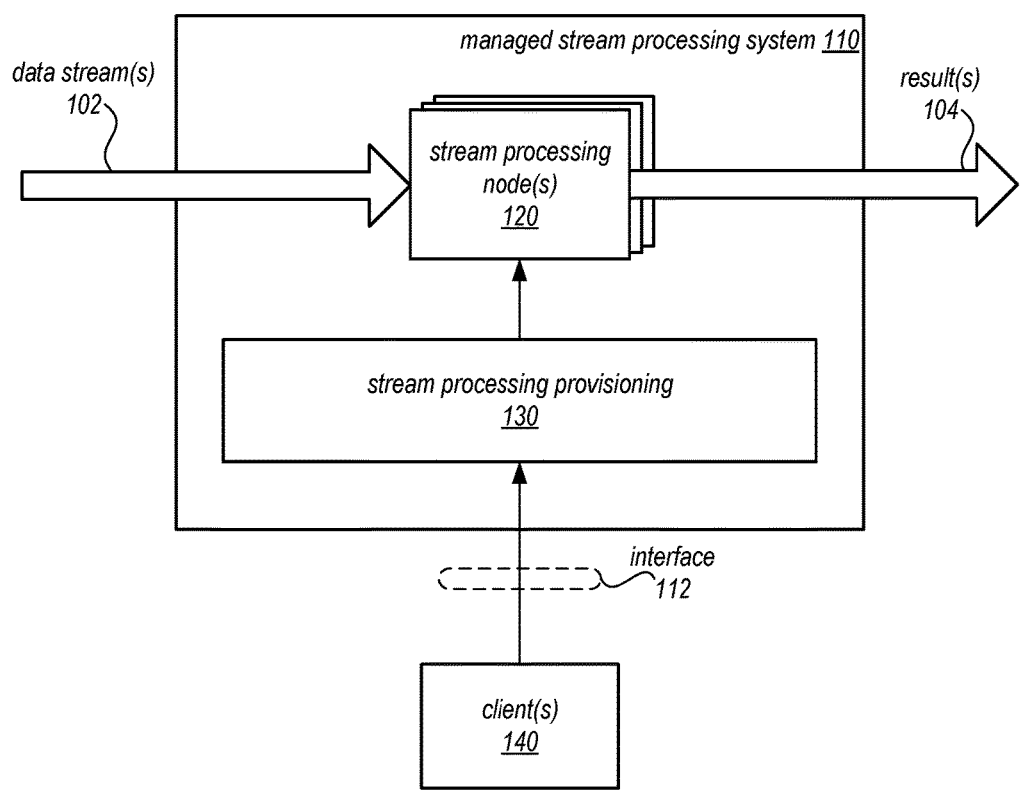
FIG. 1 is a logical block diagram that illustrates managed function execution for processing data streams in real time, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus to implement managed function execution for processing data streams in real time are described. The term "data stream," as used herein, refers to a sequence of data records that may be generated by one or more data producers and accessed by one or more data consumers, where each data record is assumed to be an immutable sequence of bytes representing one or more attributes. The records of a stream may also be referred to as observation records, observations, points, or data records herein, and the data producers may be referred to as streaming data sources. A managed stream processing system may provide programmatic interfaces (e.g., application programming interfaces (APIs), web pages or web sites, graphical user interfaces, or command-line tools) to execute functions specified via the programmatic interfaces (e.g., selected, uploaded, or modified via the programmatic interfaces) in various ways and direct the reporting of processing results to one or more destinations.

A managed stream processing system may determine a data schema and processing resources to execute stream processing functions. Stream processing functions may be specified according to standard programming languages or specifications, such as structure query language (SQL), custom programming or a numerical computation language like Matlab, domain specific languages (which may be defined and implemented by a managed stream processing system), or input forms or other interface elements (e.g., a function generation wizard) which provide a user with the ability to select input data streams, function operations (e.g., aggregation, filtering, statistical operations, etc.), and result destinations. A managed stream processing system may handle connecting or interfacing with input data streams, selecting or provisioning the appropriate stream processing nodes (or other processing resources) which may execute the specified stream processing function (e.g., implementing the appropriate execution engines, such as a storage engine that interprets SQL statements), and reporting results to result destinations. In this way, the managed stream processing system may allow users to connect, parse, and apply a real time schema on raw data streams.

Executing stream processing functions at the managed stream processing system may provide users with capability to quickly build real time computations including data filters, transformations, and aggregations without burdening users with the additional time to manually manage the resources to carry out the specified stream processing function. Moreover a managed stream processing system may offer a library of predefined stream processing functions or operations to be included within functions which may be customized to build various stream processing applications, including business-critical streaming applications like real time traffic congestion analysis, emergency call monitoring, fraud detection, and industrial sensor analytics.

FIG. 1 is a logical block diagram that illustrates managed function execution for processing data streams in real time, according to at least some embodiments. Client(s) 140 may provide stream processing functions to managed stream processing system 110 via interface 112, which may be a programmatic interface that may be invoked over a network connection between client(s) 140 and managed stream processing system 110. Managed stream processing system 110 may then implement stream processing provisioning 130 to execute the stream processing function on stream processing node(s) 120 so that as data records of data stream 102 are received stream processing node(s) 120 may apply the stream processing function and provide result(s) 104 to a specified result destination.

As noted above, client(s) 140 may specify a stream processing function to implement different applications. For example, client(s) 140 may include an operation in the stream processing function that selects certain attributes and then specify operation(s) that perform specific processing on the selected attribute (e.g., filtering out the attributes, validating the values of the attributes against known patterns, performing time series analytics). Key performance indicators (KPI) are one example of data attributes which may be extracted from a data stream for performing such operations. Client(s) 140 may utilize a stream processing function to perform stream pattern generation so that real time alerts may be triggered when detecting certain events from data stream records or so that additional data may be inserted to enrich the data conveyed in data records of a data stream. Moreover, client(s) 140 may specify stream processing functions that process across multiple data streams in order to perform complex stream processing (e.g., analyzing temporal patterns between streaming events in different streams). Stream processing records may be provided to managed stream processing system 110 complete and ready for execution (e.g., identify input streams, operations, result destinations, and other information, such as is discussed below with regard to FIG. 5). In some embodiments, clients may configure the performance of the stream processing function (e.g., by providing a distribution scheme to map data from one or multiple input data streams to a distributed set of stream processing nodes applying a stream processing function).

Once managed stream processing system 110 receives the stream processing function, stream processing provisioning 130 may analyze the input data stream(s) 102 to determine a data schema for the data stream(s) 102. For example, Stream processing provisioning 130 may read several data records of a scheme and determine that each data record has 4 attributes, 2 integer values and 2 string values, and label or define those different attributes so that the different attributes can be evaluated, manipulated removed, or otherwise transformed by a processing function (e.g., utilizing assigned attribute names as "columns" of able such that SQL queries can be executed that use the different column values). Managed stream processing system 110 may also select appropriate ones of stream processing node(s) 120 to execute the stream processing functions, such as discussed below with regard to FIGS. 3 and 8. For instance, stream processing provisioning 130 may determine whether one or multiple stream processing node(s) 120 are needed to handle the volume of data records that may be received for the identified input data stream(s). In some embodiments, stream processing node(s) 120 may be implemented as part of a multi-tenant processing model (where stream processing for unrelated stream processing functions may be executed by the same node or underlying host) and stream processing provisioning 130 may select a stream processing node 120 with the capacity to execute a received stream processing function. Stream processing provisioning 130 may identify processing features or characteristics for executing a stream processing function and identify stream processing node(s) 120 capable of providing the specified characteristics (e.g., network bandwidth or processing speed). Stream processing provisioning 130 may also configure network connections or interfaces with sources of data stream 102 and destinations of result(s) 104.

Figure 4:
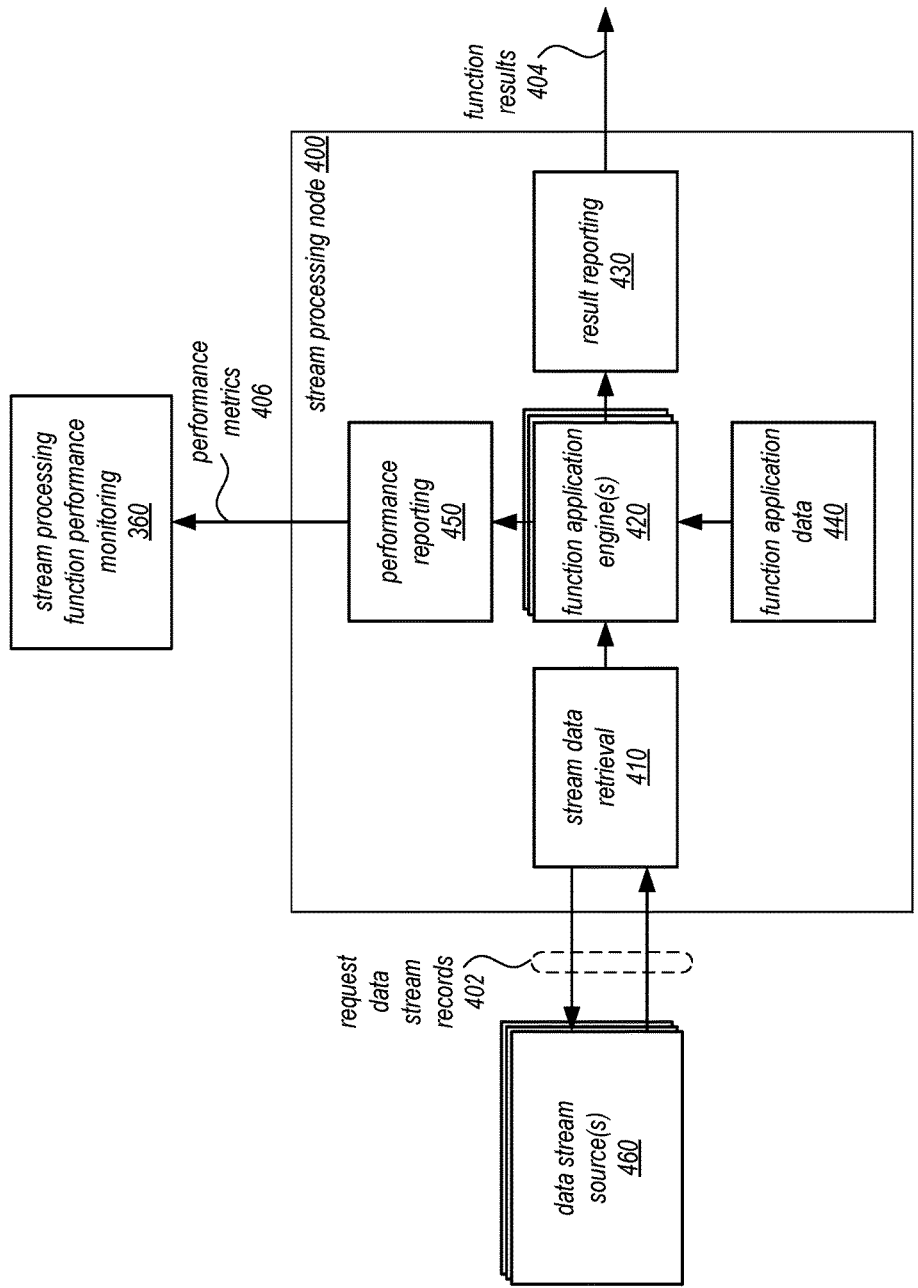
FIG. 4 is a logical block diagram of a stream processing node, according to at least some embodiments.

Stream processing node(s) 120 may execute stream processing functions on behalf of client(s) 140 on data stream(s) 102 without client intervention or direct management, such as is described in more detail below with regard to FIGS. 4 and 9. Stream processing node(s) 120 may retrieve and/or receive data stream(s) 102 via established connections or interfaces configured by stream processing provisioning 130 and implement one or multiple different execution engines to execute the stream processing function provided by stream processing provisioning 130 to stream processing node(s) 120. In some embodiments, stream process node(s) 120 may perform any necessary interpretation, compilation, or other form of analysis to execute stream processing functions (including evaluating data records to determine a data schema that maps to stream processing functions), while in other embodiments, stream processing provisioning 130 may provide an executable or other ready to run set of data that stream processing node(s) 120 may execute. Stream processing node(s) 120 may report performance metrics or other information to managed stream processing system 110 and/or to client(s) 140 in order to describe the performance of stream processing functions at stream processing node(s) 120 (e.g., for performance tuning and/or configuration).

Figure 6:
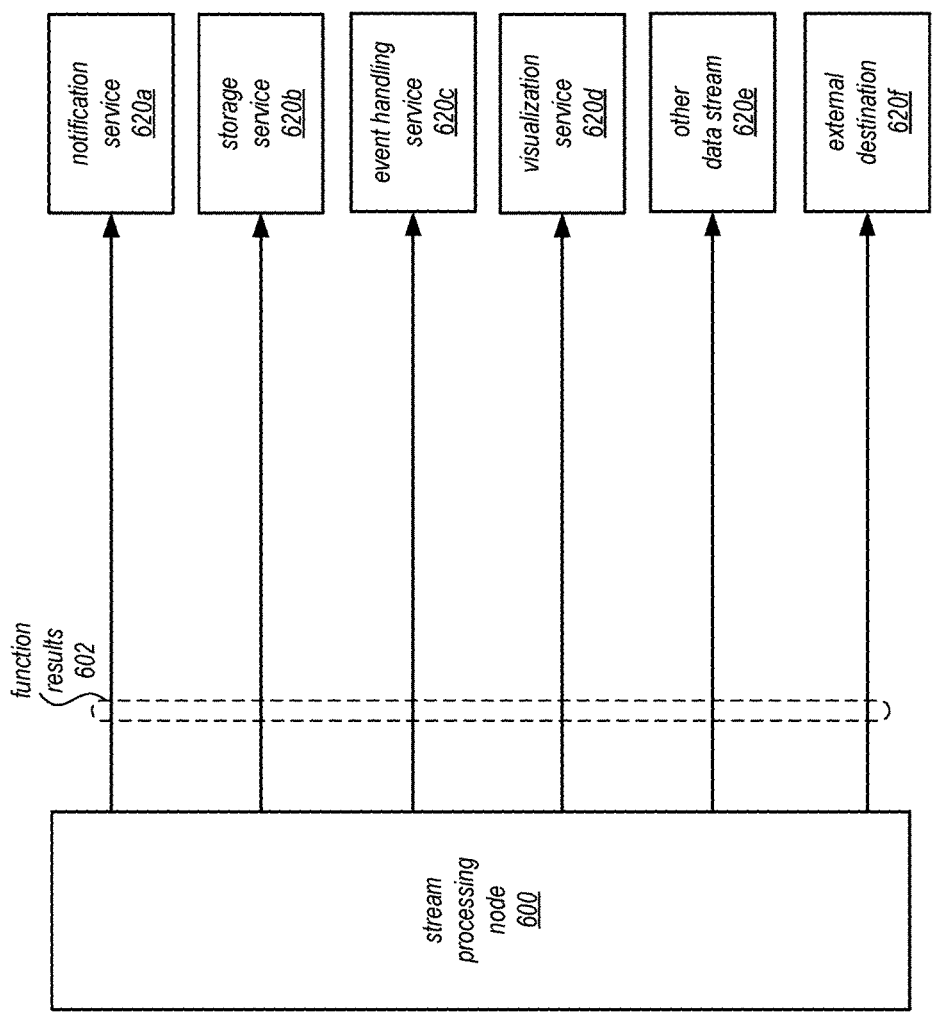
FIG. 6 illustrates interactions between a stream processing node and different destinations to deliver stream processing results, according to at least some embodiments.

There are may be many sources of data stream(s) 102. Stream management services, such as stream management service 250 discussed below with regard to FIG. 2, can create, manage, and provide access to data streams which may be specified as input data streams for stream processing node(s) 120. Other devices, systems, or services may generate streams of data records (e.g., data stores, mobile devices, data logs, or multiple devices, systems, or services of a distributed system) which may be configured to provide data streams over a network to stream processing node(s) 120 for processing. Similarly destinations for result(s) 104 of stream processing functions may be varied. For instance, some stream processing functions may direct result(s) to a data store and another system which may perform responsive actions or invoke other applications for the result(s) 104. FIG. 6, discussed in detail below, provides numerous examples of destinations for results which may be implemented, in some embodiments.

Please note that previous descriptions are not intended to be limiting, but are merely provided as a logical example of managed function execution for processing data streams in real time. Different numbers or combinations of components, systems, and/or devices may be utilized to execute stream processing functions on behalf of clients.

This specification begins with a general description of a provider network, which may implement a stream processing service that provides managed function execution for processing data streams in real time. Then various examples of a stream processing service are discussed, including different components/modules, or arrangements of components/module that may be employed as part of providing managed function execution for processing data streams in real time. A number of different methods and techniques to implement managed function execution for processing data streams in real time are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
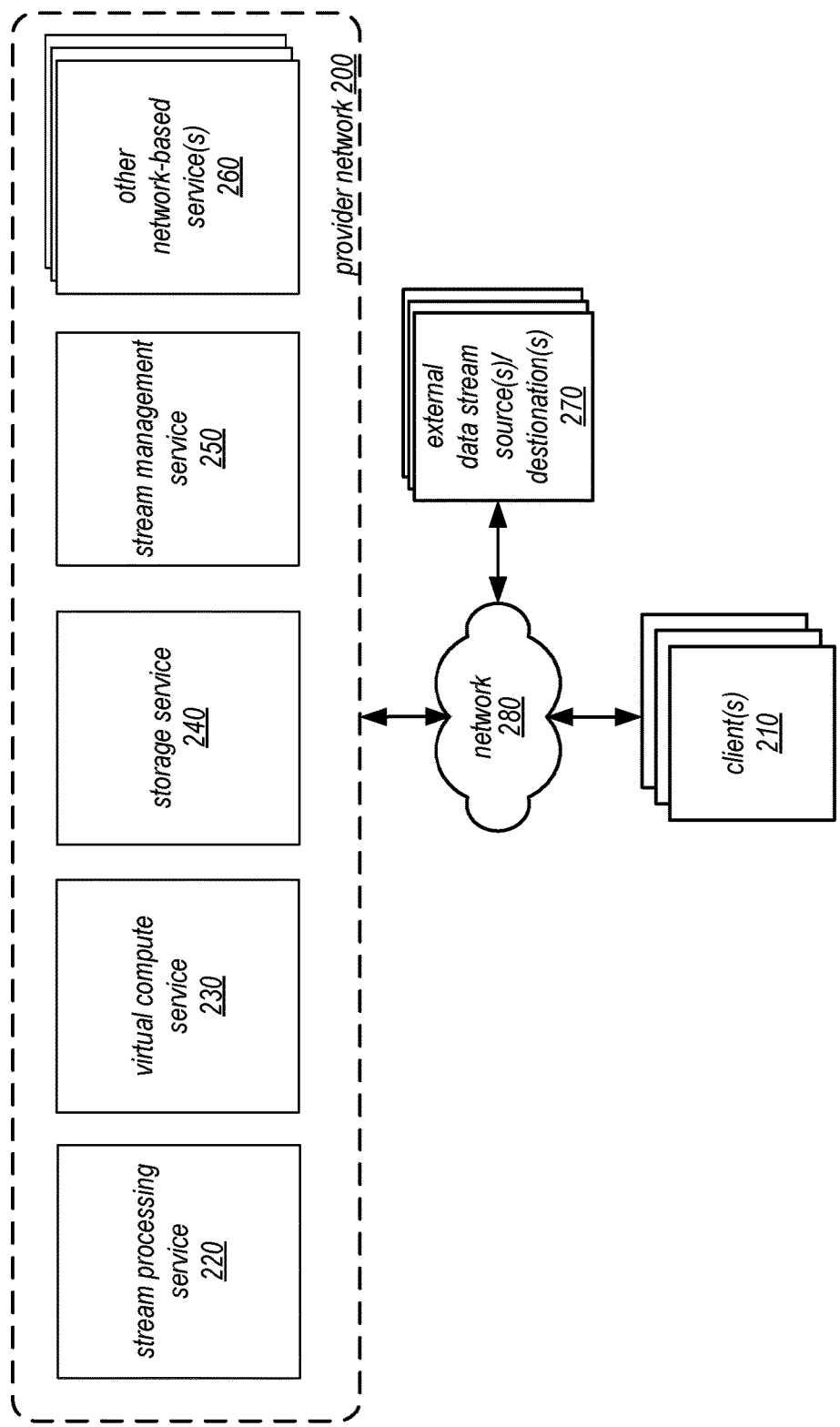
FIG. 2 is a logical block diagram illustrating a provider network that implements a stream processing service that provides managed function execution for data streams, according to at least some embodiments.
Figure 3:
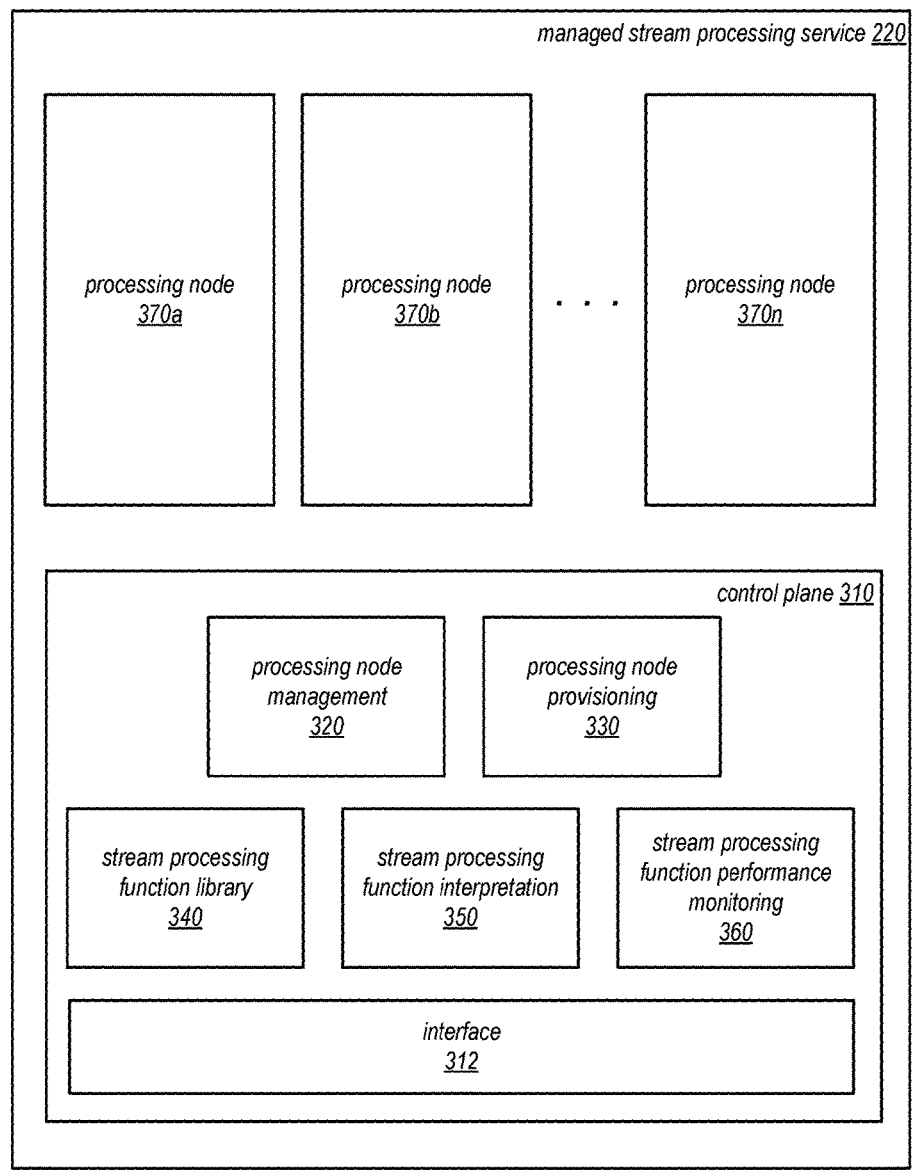
FIG. 3 is a logical block diagram of a stream processing service that implements managed function execution for processing data streams in real time, according to at least some embodiments.

FIG. 2 is a logical block diagram illustrating a provider network that implements a stream processing service that provides real time anomaly detection for data streams, according to at least some embodiments. Provider network 200 may be set up by an entity such as a company or a public sector organization to provide one or more services (such as various types of cloud-based computing or storage) accessible via the Internet and/or other networks to clients 210. Provider network 200 may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and services offered by the provider network 200. In some embodiments, provider network 200 may implement a stream processing service 220, described in detail below with regard to FIG. 3, provide computing resources, such as virtual compute service 230 and storage services 240, such as object storage services, block-based storage services, data warehouse storage services, stream management service 250, and/or any other type of network based services 270 (which may include various other types of storage, processing, analysis, communication, event handling, visualization, and security services). Clients 210 may access these various services offered by provider network 200 via network 280. Likewise network-based services may themselves communicate and/or make use of one another to provide different services. For example, computing resources offered to clients 210 in units called "instances," such as virtual or physical compute instances or storage instances, may be implemented as data producers or data consumers for a data stream processed by stream processing service 220 and services such as storage service 240, may serve as destinations for data records in the data stream, providing virtual block storage for the compute instances.

As noted above, virtual compute service 230 may offer various compute instances to clients 210. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 230 in different embodiments, including special purpose computer servers, storage devices, network devices and the like. In some embodiments instance clients 210 or other any other user may be configured (and/or authorized) to direct network traffic to a compute instance. In various embodiments, compute instances may attach or map to one or more data volumes provided by a block-based storage service (not illustrated) in order to obtain persistent block-based storage for performing various operations.

Compute instances may operate or implement a variety of different platforms, such as application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the client 210 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc . . . and (in the case of reserved compute instances) reservation term length.

Storage service 240 may include various types of storage services, such as different types of storage schemes. An object-based data store may be implemented, in various embodiments, to provide highly durable storage for data objects, such as data records stored as part of a data stream managed by stream management service 220. For instance, the object-based data store may be implemented as a key-value data store, where a data object is associated with a unique key. The key for the data object is used to access or manage the data object stored in the object-based data store. Storage service 240 may also include a data warehouse, in various embodiments, to set up, operate, and scale a data warehouse in a cloud computing environment. Data warehouse clusters hosted by the data warehouse may provide an enterprise-class database query and management system that allows users to scale the clusters, such as by sending a cluster scaling request to a cluster control interface implemented by the web-service. Scaling clusters may allow users of the web service to perform their data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, sub-queries, and aggregation, more efficiently. Storage service 240 may include various types of database systems and other data store schemes, such as a NoSQL database or various types of relational database systems. In at least some embodiments, updates or other interactions with storage service 240 may be a source for one or multiple data streams for processing by stream processing service 220.

Stream management service 250 may provide programmatic interfaces (e.g., application programming interfaces (APIs), web pages or web sites, graphical user interfaces, or command-line tools) to enable the creation, configuration and deletion of streams. The programmatic interfaces may also enable the submission, storage, analysis, transformation and/or retrieval of streaming data records in some embodiments. Some clients of the stream management system may develop applications that directly invoke the stream management system programmatic interfaces in various embodiments. In at least some embodiments, however, in addition to the stream management system interfaces, a higher-level abstraction or application-level processing framework may be provided for customers, which may simplify various aspects of stream processing for those clients that do not wish to develop applications using the lower-level stream management functions supported by the stream management system. Such a framework may provide its own programmatic interfaces (built, for example, on top of the stream management system interfaces), enabling customers to focus more on the business logic to be implemented using stream records than on lower-level stream management operations. The higher-level framework may be implemented as part of the stream management system to provide fully managed data stream.

For example, stream management service 250 may implement a data ingestion system configured to obtain data records of a particular data stream from data producers (e.g., by operating one or multiple ingestion nodes for a data stream). In some embodiments, data records of a stream may be obtained according to a scheme for partitioning the data stream. The partitioning scheme may be selected by a client of stream management service 250 for a data stream such that data records are received from data producer(s) indicating the particular partition to which the data record belongs. However, in some embodiments, a data stream may be fully managed by stream management service 250 and data producer(s) may send data records without any direction for partitioning. Instead, the data ingestion system may assign data records to route the data records to identified partition. Once ingested, stream management service may store obtained data records (e.g., on corresponding storage nodes provisioned for a the data stream). Such storage nodes may record, save, store or otherwise persist the data records on any of various types of storage devices (which may be performed in accordance with a persistence policy for the data stream).

In order to retrieve data from the data stream, stream management service may provide a retrieval system (e.g., implementing retrieval nodes) that may access the stored data records of the data stream. In some embodiments, data retrieval may be performed in response to request from consumers (e.g., stream processing nodes that perform processing on data stream data).

Stream management service 250 may provide an interface that supports one or more sets of programmatic interfaces (e.g., application programming interfaces (APIs), web pages or web sites, graphical user interfaces, or command-line tools) to enable the creation, configuration and deletion of data streams (both client-managed or fully-managed), as well as the submission, storage and retrieval of stream data records in some embodiments. For instance, data producers may be configured to place data records into a data stream by utilizing a client library provided by stream management service 250 to utilize requests, sending a "putRecord" request to stream management service 250 via the interface. Similarly, data consumer(s) may be configured to access stream management service 250 via the interface and utilize the client library provided by stream management service 250 to "getNextRecords" when executing an application to retrieve the next data records to be processed in the data stream.

Other network-based services 260 may include various services, including services configure networking of client provider network resources (e.g., load balancing), security (e.g., firewalls, access control), communication (e.g., notification or messaging systems), event driven execution services, visualization services or services for further data processing. External data stream source(s)/destination(s) 270 may provide data streams which may be processed by stream processing service 220 and/or serve as destinations for the results generated by stream processing service 220. For instance, external data stream sources may be system that collects crowd sourced information (e.g., traffic or temperature) and assembles single data stream of the sourced data for processing to stream processing service 220. External data stream source(s)/destination(s) may be a private data store or processing system which may operate further on results reported from stream processing service 220.

Clients 210 may encompass any type of client configurable to submit requests to network provider 200. For example, a given client 210 may include a suitable version of a web browser, or may include a plug-in module or other type of code module configured to execute as an extension to or within an execution environment provided by a web browser. Alternatively, a client 210 may encompass an application such as a database application (or user interface thereof), a media application, an office application or any other application that may make use of compute instances, a data volume 226, or other network-based service in provider network 200 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 210 may be configured to generate network-based services requests according to a Representational State Transfer (REST)-style network-based services architecture, a document- or message-based network-based services architecture, or another suitable network-based services architecture. In some embodiments, a client 210 (e.g., a computational client) may be configured to provide access to a compute instance or data volume 226 in a manner that is transparent to applications implement on the client 210 utilizing computational resources provided by the compute instance or block storage provided by the data volume 226.

Clients 210 may convey network-based services requests to provider network 200 via external network 260. In various embodiments, external network 280 may encompass any suitable combination of networking hardware and protocols necessary to establish network-based communications between clients 210 and provider network 200. For example, a network 280 may generally encompass the various telecommunications networks and service providers that collectively implement the Internet. A network 280 may also include private networks such as local area networks (LANs) or wide area networks (WANs) as well as public or private wireless networks. For example, both a given client 210 and provider network 200 may be respectively provisioned within enterprises having their own internal networks. In such an embodiment, a network 280 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and provider network 200. It is noted that in some embodiments, clients 210 may communicate with provider network 200 using a private network rather than the public Internet.

FIG. 3 is a logical block diagram of a stream processing service that implements managed function execution for processing data streams in real time, according to at least some embodiments. Managed stream processing service 220 may receive stream processing functions via interface 312 and provision one or more processing nodes 370 from a pool of processing nodes 370 to execute the stream processing function. As illustrated in FIG. 3, managed stream processing service 220 may implement control plane 310 to manage the execution of stream processing functions at stream processing nodes 370.

In various embodiments, control plane 310 may implement interface 312 which may be a programmatic interface invoked by various calls or interactions by clients of managed stream processing service 220. For instance, as discussed below with regard to FIG. 5, a client may send a request to create a stream processing application that includes a stream processing function. This request may be formatted according to an API call (e.g., "createStreamProcessor") and may include as parameters of the call one or more operations to perform with respect to the data stream (e.g. query, add, remove, transform, aggregate, calculate, etc.), input data streams (e.g., data stream names, network addresses, or other identification information), and result destinations (e.g., data store names, network addresses or other identification/connection information. Interface 312 may be invoked by a command line interface or may be implemented as part of a graphical user interface, such as discussed below with regard to FIG. 7. Interface 312 may also provide for the uploading of stream processing functions (e.g., written in a coding language or provided as an executable or other object that may perform stream processing function).

In at least some embodiments, control plane 310 may implement stream processing function interpretation 350. Stream processing interpretation 350 may provide various libraries, compilers, or any other kind of interpreter that may receive a stream processing function (e.g., operations, input data streams, destinations, etc.) and generate an executable form (e.g., object code, byte code, workflow, or other set of instructions). For example, in some embodiments, processing nodes 370 may implement a common execution engine so that stream processing functioning interpretation 350 may provide an executable that can run on any available processing node. In some embodiments, stream processing function interpretation 350 may validate received stream processing functions for errors (e.g., same input and result destination), leaving interpretation and execution to other components, such as execution engines located at processing nodes 370. In various embodiments, stream processing function 350 may evaluate input data streams to determine a data scheme for the execution of a stream processing function. For instance, stream processing function interpretation may access and analyze a group of data records to determine a schema for the data stream, including labeling or identifying common or expected attributes in data records, which may be provided back to a client via interface 312.

In at least some embodiments, control plane 310 may implement a stream processing function library 340 which may provide a collection of common and/or user submitted stream processing functions (or individual operations for stream processing functions). For example, stream processing functions to filter, aggregate, or generate a rolling average may be stored as part of stream processing function library 340. A client may select a stream processing function from the library and adapt or customize it for execution (e.g., supply input data stream information, result destinations, etc.) via interface 312. In this way, stream processing function library 340 may maintain stream processing functions that are common may be easily adapted for different stream processing applications.

Processing node provisioning 330 may be implemented as part of control plane 310, in various embodiments, in order to provision processing nodes for received stream processing functions. In at least some embodiments, processing node provisioning 330 may perform a preliminary analysis to determine the processing requirements or configuration for a stream processing function. If, for instance, multiple data input streams are indicated, then processing node provisioning 330 may determine whether one or multiple processing nodes 370 may need to be acquired in order to execute the stream processing function. If multiples stream processing nodes may be determined, then processing node provisioning 330 may determine a mapping scheme to distribute data amongst the processing nodes 370 and reconstitute or aggregate results from individual processing nodes 370 for reporting. Processing node provisioning may, as noted above, identify required performance characteristics or other stream processing function requirements and obtain and select the appropriate processing nodes, as discussed below with regard to FIG. 8.

Once processing nodes 370 are selected, processing node provisioning 330 may configure or obtain the appropriate access credentials to provide the processing nodes 370*a* with access to the input data streams and result destinations. For instance, if security credentials are required, then processing node provisioning may parse information supplied by a client to managed stream processing service when the stream processing function was submitted in order to extract the security credentials for providing process nodes 370 with access. Processing node provisioning 330 may provide the operation(s) and other information to processing nodes 370 in order to initiate execution of the stream processing function (e.g., by providing a SQL statement, executable, or other instructions for applying the stream processing function), which in some embodiments may be generated by a stream processing function interpretation 350.

In various embodiments, control plane 310 may implement processing node management 320 to manage the execution of stream processing functions at processing nodes 370. For instance, based on performance metrics received via stream processing function performance monitoring 360, such as metrics that indicate processing utilization, network utilization, memory utilization, or any other computational performance metric, may indicate that a processing node 370 is unable to keep up with the stream of data records received (e.g., by measuring result output rates, memory utilization, ingress buffers for network packets, etc.). Processing node management 320 may request another processing node 370 from processing node provisioning 330 in order to split the workload for the one processing node among 2 (or more) processing nodes. Various other management functions, such as migrating a stream processing function from one process node to another, changing mappings for partitioned data streams, or any other real time changes in configuration to the execution of a stream processing query may be performed by processing node management 320. In some embodiments, clients may submit reconfiguration requests to control plane 310 to change the execution configuration of data streams (e.g., change the number of processing nodes for a stream processing query).

In some embodiments, control plane 310 may implement stream processing function performance monitoring 360. Performance monitoring 360 may be implemented in order to provide feedback to processing node management 320 and/or clients of managed stream processing service 220. For instance, a function performance report, such as discussed below with regard to FIG. 5 may be generated and sent via interface 312 by performance monitoring 360.

Managed stream processing service 220 may implement a pool of stream processing nodes 370a through 370n which may be implemented on dedicated hardware hosts (e.g., such as computing system 1000 in FIG. 10 below) or may be implemented as virtual instances (e.g., by provisioning compute instances of computing service 230 in FIG. 2). FIG. 4 is a logical block diagram of a stream processing node, according to at least some embodiments. Stream processing node 400 may retrieve data records for data streams in order to apply a stream processing function (or assigned portion/operation of stream processing function) and deliver results generated by applying the stream processing function to a specified destination.

Stream processing node 400 may implement stream data retrieval 410 in order to interface with a data stream source(s) 460. As noted above different types of data stream sources may be implemented. A data stream implemented by a managed stream interface may, for instance, have an interface that allows stream data retrieval to request data stream records 402 individually. Stream data retrieval 410 may periodically request 402 new data records in the stream (e.g., as part of a polling behavior). Throttling, buffer, and other processing rate controls may be implemented by stream data retrieval 410 in order to prevent stream processing node 400 from being overwhelmed. For example, a throttle threshold may be implemented that limits the number data records that may be queued or buffered for processing at stream processing node 400. A timeout or other delay may be performed when the number of data records exceeds the throttle threshold so that stream processing node 400 does not drop or otherwise fail to process the data records received a stream processing node 400. In some embodiments, stream data retrieval 410 may be configured to register and listen for data stream records acting as a network endpoint for data stream source 460 to automatically send data stream records.

Stream processing nodes 400 may implement function application engine(s) 420 to perform the operation(s) of the stream processing function on data records retrieved by stream data retrieval 410. In some embodiments, function application engine(s) 420 may be implemented for a specific scheme or structure of data records. For example, in some embodiments data records may specify data records in a relational format with rows as different data records and columns as different attributes. Function application engine(s) 420 may act as a storage engine (e.g., SQL engine) that applies the specified operations (e.g., select, add, remove, modify, etc.) to data records according to the data scheme of the data records. Thus if function application engine 420 were a SQL storage engine, for instance, function application engine 420 would treat a data record as a table and perform the specified operations upon attributes of a data records that mapped to different columns of the table. In some embodiments, function application engine(s) 420 may be an execution platform (e.g., for executables, workflows, or other instructions provided by control plane 310) that parses data records, performs the specified operations, and generates the desired results. Note that the previous examples are not intended to be limiting as many different types of function application engine(s) 420 may be implemented to perform specified operations for a stream processing function. In some embodiments, operations may rely upon function specific data, such as function application data 440, to perform operations (e.g., inserting various tags, flags, or other information to enrich a data record). Function application data 440 may be stored locally at stream processing node 400 or may be obtained from a remote data store or service (e.g., from storage service 240 in FIG. 2).

Stream processing node 400 may implement result reporting 430 to direct the sending of results 404 to specified destinations. In some embodiments, multiple destinations for results may be specified. As with stream data retrieval 410, result reporting 430 may utilize different programmatic interfaces to register with and obtain access to the specified destinations. Result reporting 430 may, for example, reformat results 404 into the appropriate request, format, or scheme in order to ensure proper delivery of the reported results 404. Result reporting 430 may buffer results 404 into fewer messages in order to reduce network traffic, in some embodiments. In some embodiments, results may be based on processing function (or operation) state that is updated each time a data records is processed, and only provided at certain times. For instance, a running average state for a window of data records may be updated each time a data record is received, but the running average value may only be provided periodically (e.g., every 30 minutes, 1 hour, etc.) In at least some embodiments, data records that do not conform to the data scheme (e.g., missing attributes or different types of attributes, such as when an attribute value is expected to be a string but is instead an integer), may be stored, directed, or otherwise reported to an error store, for reconciliation with the data stream (e.g., by a user).

In at least some embodiments, stream processing node 400 may implement performance reporting 450. Performance reporting 450 may collect utilization, timing, and other performance related statistics for the execution of a stream processing function. Performance reporting 450 may periodically send these performance metrics 406 to stream processing function performance monitoring 360 for the various uses discussed above. In some embodiments, performance reporting 450 may track the performance metrics and provide them upon request from stream processing performance monitoring 360 (so that stream processing function performance monitoring 360 may implement a sweeper style metrics gathering in order to avoid being overwhelmed with metrics reporting across a fleet of stream processing nodes 400).

Figure 5:
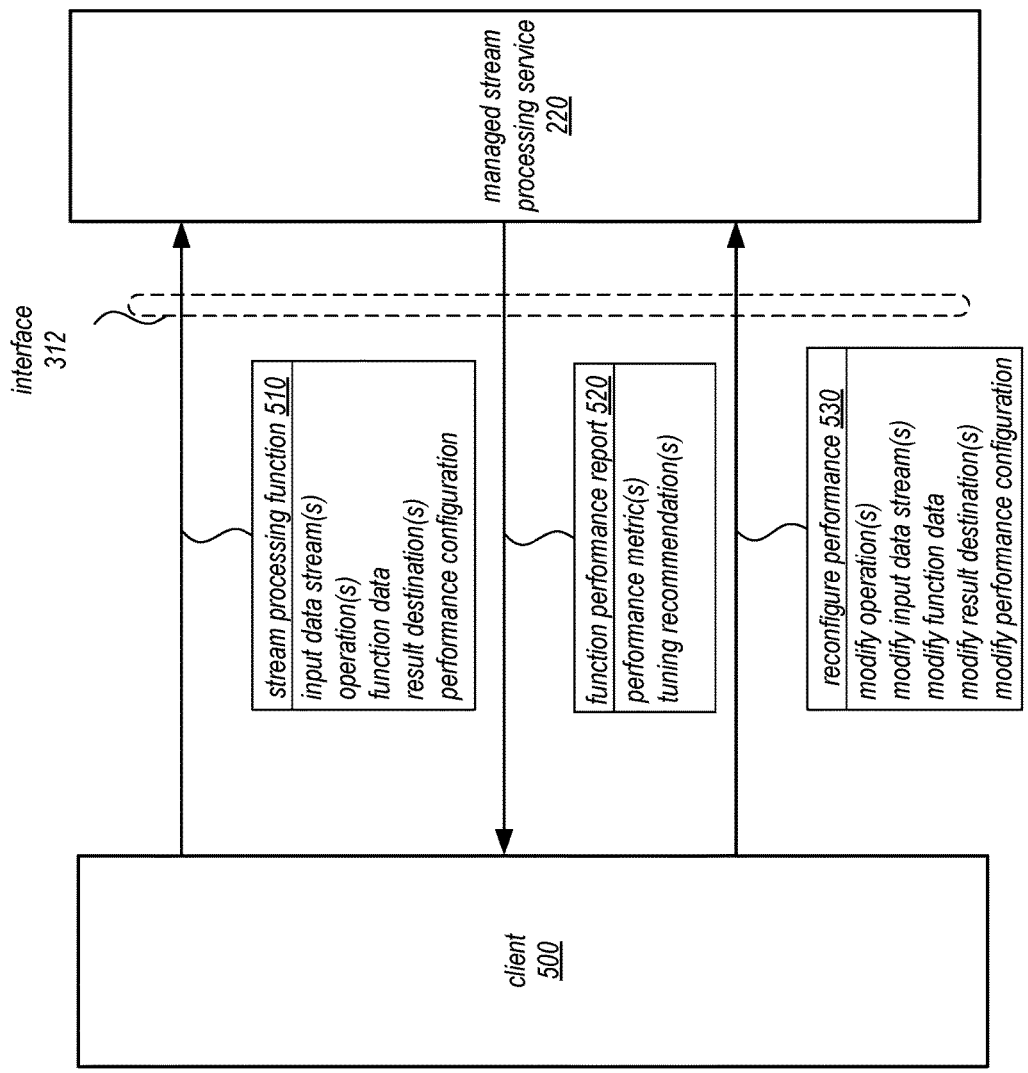
FIG. 5 illustrates interactions between a client and a stream processing service via a programmatic interface, according to at least some embodiments.

FIG. 5 illustrates interactions between a client and a stream processing service via a programmatic interface, according to at least some embodiments. Client 500 (which may be a client 210 in FIG. 2) or other client of managed stream processing service 220 may be configured to access or request actions via interface 312. For instance, a request to execute a stream processing function 510 may be sent via interface 510 to managed stream processing service 220. Request 510 may include information to execute the stream processing function including, but limited to, input data stream(s) (e.g., providing identifiers, network addresses, access information/credentials, etc.), operation(s) to be performed (e.g., various operations to filter, aggregate, modify, transform, separate, or otherwise manipulate data records, including various analytical statistics which can be calculated or tracked for the data stream over time), function data (e.g., a lookup table, pointer to a data store, or other information indicating additional data which may be inserted or utilized to perform specified operations), result destination(s) (e.g., providing data objects, data stores, network addresses, access information/credentials, data formats, multiple destinations, etc.). In some embodiments, request 510 may include a particular performance configuration (e.g., specifying a single processing node for performing the stream processing function, a distributed group of processing nodes including a distribution scheme to identify how the workload for processing the data stream should be distributed amongst the group of processing nodes). In some embodiments, request 510 may identify performance targets or thresholds for the stream processing function that could be used by managed stream processing service to determine a configuration for executing the stream processing function or which if exceeded (or not met) would trigger reconfigurations of the stream processing node(s) by managed stream processing service 220 (which may automatically determine a different configuration that would satisfy the desired performance).

In at least some embodiments, managed stream processing service 220 may provide a function performance report 520 for actively executing stream processing functions on behalf of client 500 via interface 312. For instance, managed stream processing service 220 may provide periodic (e.g., hourly or daily) performance reports, or may provide performance report 520 in response to certain events (e.g., failing a performance threshold or detecting an error event for the stream processing function). The function report 520 may include various performance metric(s) for the execution of the stream processing function, such as various kinds of hardware resource utilization (e.g., memory, processor, storage device, or network bandwidth), average processing time per data record, or any other indication of performance for the executing stream processing function. In at least some embodiments, function performance report 520 may include various tuning recommendations for reconfiguring the execution of the stream processing function (e.g., changing the number of processing nodes, redistributing the performance of different operations among processing nodes, recommending more efficient or more accurate operations to replace one or more specified operations in the stream processing function.

In at least some embodiments, client 500 may be able to act upon tuning recommendations or reconfigure the performance of a stream processing function at will by sending a reconfigure performance request 530. Reconfigure performance request 530 may include various parameters, such as changes or modifications to various operations performed as part of the processing operation (e.g., changes to a "SELECT" SQL statement to create a more efficient search). In some embodiments, request 530 may modify or change to different input data stream(s) (e.g., in order to utilize a different data source for applying the stream processing function). For those stream processing functions that utilize additional function data to perform operations, changes may be request to modify the function data used (e.g., swap lookup tables or provide a local copy of frequently accessed data so that a remote copy need not be accessed).

FIG. 6 illustrates interactions between a stream processing node and different destinations to deliver stream processing results, according to at least some embodiments. A stream processing node 600 may be configured to interact with numerous types of remote systems, components, or devices so that function results 602 may be transmitted to specified destinations. For example, as illustrated in FIG. 6, function results 602 may be provided to a notification service 620a (which may another network service 260 of provider network 200 in FIG. 2). Notification service 620a may then deliver messages generated based on results (e.g., errors, goals met, daily status, etc.) instantly to other many other types of systems components, or devices across different protocols utilized by applications or users so that polling for results 602 need not be performed.

In some embodiments, function results 602 may be provided to a storage service 620b (which may be storage service 240 of provider network 200 in FIG. 2). For example, the data storage service 620b may store results as a log for subsequent event analysis, a data object for a specific period of time (e.g., daily or hourly results), a knowledge base for performing cost-intensive machine learning algorithms, such as patter recognition or feature selection, or data warehouse for efficient large scale data storage and access. In some embodiments, function results 602 may be provided to an event handling service 620c (which may another network service 260 of provider network 200 in FIG. 2). Event handling service 620c may, for instance, run code or other specified set of actions to act as an application or backend service that automatically runs and scales the code execution for high availability based on received results 602 (e.g., generating new user profiles in a data store upon receiving a new user result from processing a data stream). In some embodiments, function results 602 may be provided to visualization service 620d (which may be another network service 260 of provider network 200 in FIG. 2). Visualization service 620d may take function results 602 and automatically infers data types and relationships, and recommend, suggest, and/or generate visualizations of results 602 (e.g., automatically generating graphs visualizing user age distribution for a given time period provided as function results 602 for a data stream).

In some embodiments, function results 602 may be provided as input to another data stream 620e (such as a data stream managed by stream management service 250 in FIG. 2). For example, certain error events identified as part of function results 602 may be input into a data stream for error events that aggregates error events across multiple different sources of data streams for analysis. External destination 620*f* may be a data store, service, system, component or device external to provider network 200 which may also receive function results 602. Stream processing node 600 may acquire (as part of the provisioning and/or configuring of the execution of a stream processing function the appropriate credentials, location, or other information necessary to communicate with external destination 620*f*.

Figure 7A:
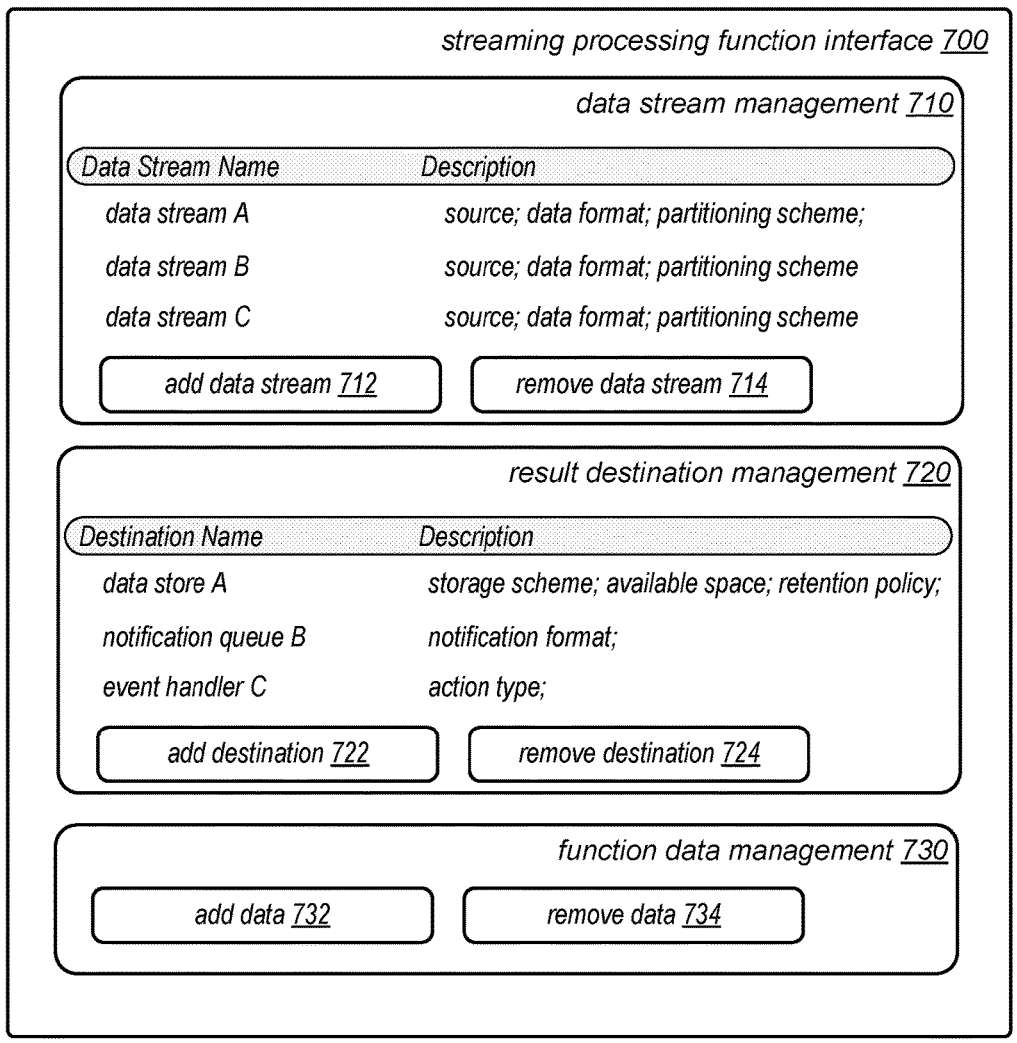
FIGS. 7A and 7B are examples of a graphical user interface for providing a stream processing function for processing one or more data streams, according to at least some embodiments.
Figure 7B:
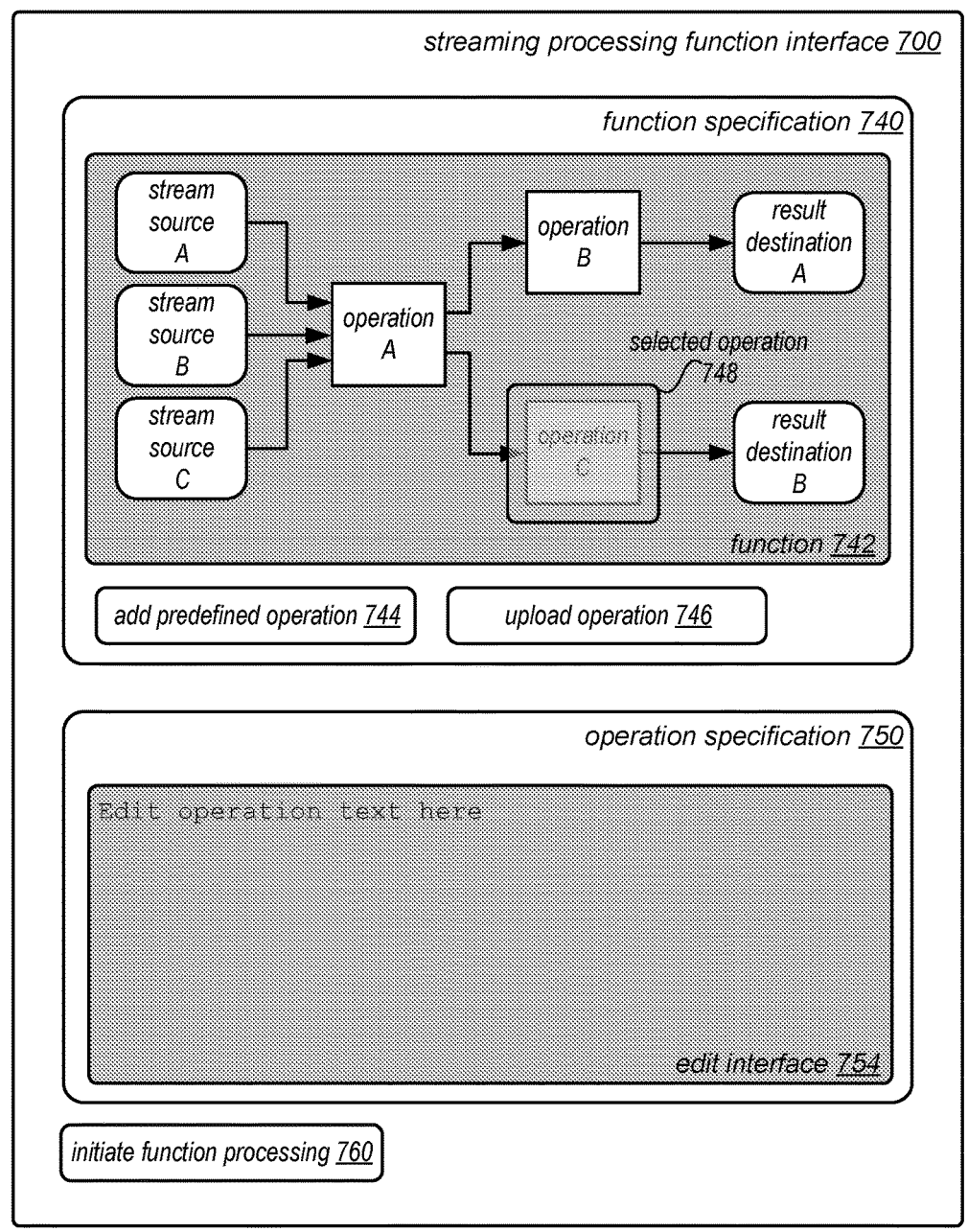

FIGS. 7A and 7B are examples of a graphical user interface for providing a stream processing function for processing one or more data streams, according to at least some embodiments. Stream processing function interface 700 may be implemented as part of one or a series of different network-based sites (e.g., websites) that provide a graphical user interface for interacting with a managed stream processing service. Stream processing function interface 700 may itself utilize various underlying APIs or other calls to initiate the execution of a stream processing function.

In FIG. 7A, in at least some embodiments, stream processing function interface 700 may implement a data stream management element 710 which may provide various controls, interfaces, or other graphical elements to identify input data streams. In the example illustrated in FIG. 7A, descriptive information of the data stream including a data stream name (e.g., which may be utilized in various textual function specifications, such as "SELECT * FROM data stream A") and other data stream specific information (e.g., source, format, or partitioning scheme—if any). User interface elements to add a data stream 712 or remove a data stream 714 may be included to allow users to manage those data streams which may be used as inputs for a stream processing function.

In at least some embodiments, stream processing function interface 700 may implement a result destination management element 720 which may provide various controls, interfaces, or other graphical elements to identify result destinations. In the example illustrated in FIG. 7, descriptive information of the destinations including a destination name (e.g., which may be utilized in various textual function specifications, such as "INSERT INTO data store A") and other data stream specific information (e.g., storage scheme, available space, retention policy, notification format, or action type). User interface elements to add a destination 722 or remove a destination 724 may be included to allow users to manage those destinations which may be used as outputs for a stream processing function.

In at least some embodiments, stream processing function interface 700 may implement a function data management element 730 which may provide various controls, interfaces, or other graphical elements to upload, identify, or remove function data. For example, user interface element 732 may be selected to upload a lookup table which specifies different values to be inserted or modified for different data records. Similarly, user interface element 534 may allow a user to remove function data that is no longer utilized or obsolete.

In at least some embodiments, stream processing function interface 700 may implement a function specification element 740 which may provide various controls, interfaces, or other graphical elements to upload, select, specify, and initiate the execution of a stream processing function, as illustrated in FIG. 7B. For example, a function, such as function 742 may be graphically illustrated to illustrate the various connections between stream sources, operations and result destinations. Operations, such as selected operation 748, connections, sources, or result destinations may be selected, reconfigured, added, or removed from function 742 by manipulating the representative graphical elements. User interface elements, such as element 744, may be implemented to allow a user to select previously saved or defined operation (e.g., from stream processing functions library 340 in FIG. 3) inclusion in function 742. Function specification 740 may also implement a user interface element 746 to upload operations (or entire functions). For instance, selecting the upload operation element 746 may initiate a series of user interface windows or interactions to perform a data transfer from a client to managed stream processing service 220 that includes a code file or executable object.

Stream processing function interface 700 may also implement operation specification 750 to modify operations for a processing function. Edit interface 754 may provide a space to manually enter a stream processing operation that is new or edit a selected predefined operation, such as selected operation 748 (e.g., change input streams, destinations, or modify operations). In this way, users can easily modify stream processing operations for different applications without writing an entirely new stream processing function. Initiate function processing element 760 may trigger a request to begin execution of the stream processing function by managed stream processing service 220 in various embodiments.

The examples of managed function execution for processing data streams in real time as discussed above with regard to FIGS. 2-7 have been given in regard to a stream processing service and/or other network-based services. Various other types or configurations of distributed systems processing data from a data stream may implement these techniques. For example, large-scale distributed environments operated by a single business entity may implement managed function execution for processing data streams in real time for its own applications. Moreover, different configurations of the various modules, components, systems, and or services described above that may implement managed function execution for processing data streams in real time. Thus the stream management service discussed above serves as one example context in which many of the stream management and processing techniques described herein may be implemented. However, the techniques discussed below with regard to FIGS. 8 and 9 may be also implemented using the managed stream processing service as discussed above.

Figure 8:
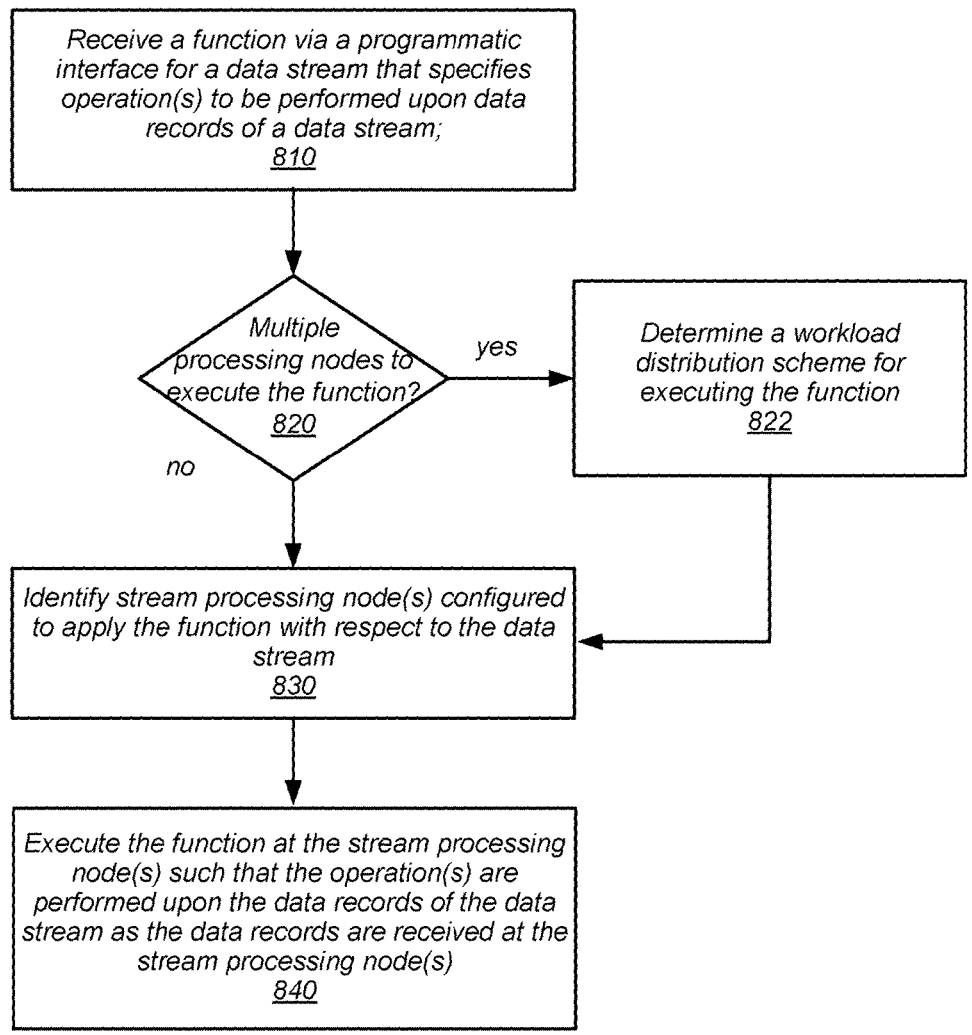
FIG. 8 is a high-level flowchart illustrating various methods and techniques to provision stream processing nodes for executing a stream processing function in real time for a data stream, according to at least some embodiments.

FIG. 8 is a high-level flowchart illustrating various methods and techniques to provision stream processing nodes for executing a stream processing function in real time for a data stream, according to at least some embodiments. As indicated at 810, a function may be received via programmatic interface for a data stream that specifies one or more operations to be performed upon data records of one or more data streams. The function may include input data stream(s) (e.g., providing identifiers, network addresses, access information/credentials, etc.), the operation(s) to be performed (e.g., various operations to filter, aggregate, modify, transform, separate, or otherwise manipulate data records, including various analytical statistics which can be calculated or tracked for the data stream over time), function data (e.g., a lookup table, pointer to a data store, or other information indicating additional data which may be inserted or utilized to perform specified operations), and result destination(s) (e.g., providing data objects, data stores, network addresses, access information/credentials, data formats, multiple destinations, etc.). The function may be specified according to standard programming languages or specifications, such as structure query language (SQL), custom programming or a numerical computation language like Matlab, domain specific languages, or input forms or other interface elements. In at least some embodiments, data records of the data stream may be evaluated to determine a data scheme for the data stream.

The processing nodes configured to apply the function may be determined in various embodiments. For example, as indicate at 820, a determination may be made as to whether multiple processing nodes are needed to execute the function. A client may specify a distributed processing scheme, in various embodiments (e.g., a parallel processing scheme), or the size or format of data may be analyzed to identify whether a single processing node could perform the operations of the function with a minimum level of performance. If multiple processing nodes are required, in some embodiments, a determination may be made to identify a workload distribution scheme for executing the function among the multiple processing nodes. For instance, a simple parallel processing scheme may be utilized where each processing node performs the same operations on different data records. In some embodiments, different operations may be assigned to different processing nodes. For example, processing intensive operations may be parallelized among multiple nodes while a non-intensive operation may be assigned to a single processing node.

As indicated at 830, stream processing node(s) configured to apply the function with respect to the data stream may be identified, in various embodiments. For instance, if the function is specified according to a particular language (e.g., SQL), the processing nodes that implement execution engines capable of compiling/interpreting the particular language may be selected. The data scheme determined for the data stream may be used to map the operations of the processing function to attributes of data records in the data stream (e.g., by mapping specified "columns" in a SQL statement to the appropriate attributes in data records of the data stream). In some embodiments, configured or capable processing nodes may have certain performance characteristics (e.g., processing bandwidth, network bandwidth, etc.) which satisfy certain performance targets or thresholds specified by a client.

As indicated at 840, the function at the stream processing node(s) may then be executed such that the operation(s) are performed upon the data records of the data stream as the data records are received. For instance, the function may be provided to the identified nodes, and the various connections established so that data records from the data streams may be retrieved in order to execute the function.

Figure 9:
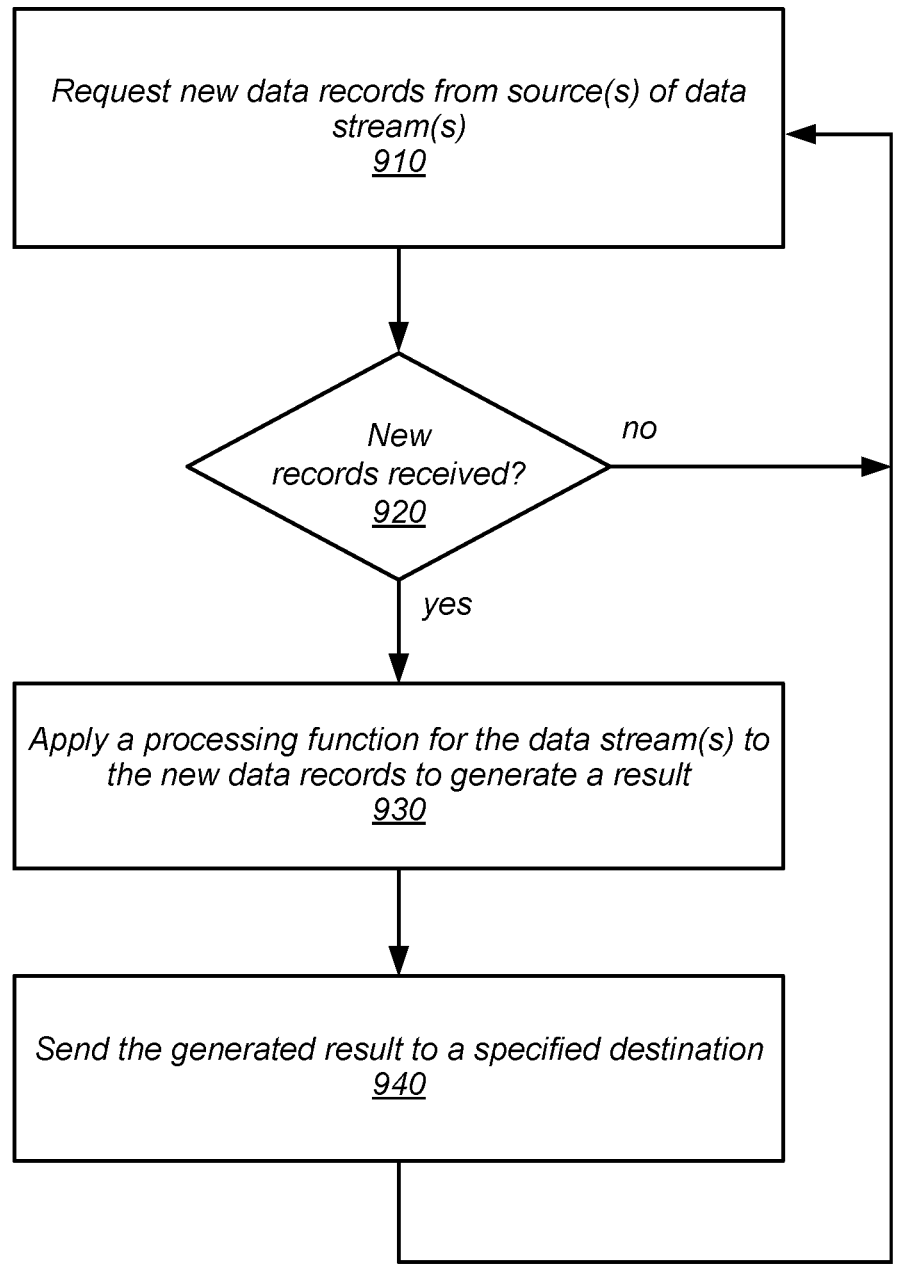
FIG. 9 is a high-level flowchart illustrating various methods and techniques to apply a stream processing function at stream processing nodes, according to at least some embodiments.

FIG. 9 is a high-level flowchart illustrating various methods and techniques to apply a stream processing function at stream processing nodes, according to at least some embodiments. Stream processing nodes, such as stream processing node 400 in FIG. 4 above, may request new data records from source(s) of data streams (e.g., by implementing a polling behavior to check for new data records periodically). In some embodiments, a throttling threshold may be enforced such that if a number of data records being currently processed at a stream processing node exceeds a throttling threshold, then a request for new data records may be delayed. If new data records are received, as indicated by the positive exit from 920, then the stream processing nodes may apply the processing function for the data stream(s) to the new data records in order to generate a result, as indicated at 930, or other state information maintained for the processing function. The generated result may then be sent to a specified destination for the function, as indicated at 940. In some embodiments, results may not be generated for each data record that is received, but instead may be generated upon the expiration of a window of time, amount of data, or number of records. For instance, an average attribute value may be updated as part of state information maintained for a data stream as each data record is received, but a result for the data stream, such as an average attribute value for a 30 min period may not be provided until the 30 minute time window has passed (based on the updated processing function state). Stream processing nodes may continue to process new data records in the data stream as they are received so as to provide real time application of the processing function in streaming fashion.

The techniques described above may be useful in a number of scenarios. For example, large provider networks may comprise thousands of instance hosts implementing service instances of a number of different multi-tenant or single-tenant services for tens of thousands of clients simultaneously. Monitoring and/or billing agents installed on the various instances and hosts may rapidly generate thousands of metric records, which may need to be stored and analyzed to produce accurate billing records, to determine effective provisioning plans for the data centers of the provider network, to detect network attacks, and the like. The monitoring records may form an input stream to a managed stream processing service so that the techniques described may be implemented for the analysis of the collected records. Similarly, applications to collect and analyze large numbers of log records from numerous log sources (e.g., application logs from the nodes of a distributed application, or system logs from the hosts or compute instances at a data center) may also be able to utilize managed stream processing services. In at least some environments, the processing operations for data records may comprise a real-time ETL (Extract-Transform-Load) processing operation (i.e., an operation that transforms received data records in real time for loading into a destination, instead of doing the transformation offline), or a transformation of data records for insertion into a data warehouse. Using a data stream for loading data into a data warehouse in real time may avoid the delays that are typically required to clean and curate data from one or more data sources, before the data can be inserted into a warehouse for analysis.

A number of different "big data" applications may also be built using the SMS and processing techniques. For example, the analysis of trends in various forms of social media interactions may be performed efficiently using streams. Data collected from mobile phones or tablet computers, such as location information of the users, may be managed as stream records. Audio or video information, collected for example from a fleet of monitoring cameras may represent another category of streaming data set that could be collected and processed in a scalable manner, potentially helping prevent attacks of various kinds. Scientific applications that require analysis of ever-growing data sets, collected for example from weather satellites, ocean-based sensors, forest-based sensors, astronomical telescopes, may also benefit from the stream management and processing capabilities described herein.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers, resource hosts, control planes, managers and/or other components, such as those that implement the block-based storage service described herein). The various methods as illustrated in the figures and described herein represent example embodiments of methods. The order of any method may be changed, and various elements may be added, reordered, combined, omitted, modified, etc.

Figure 10:
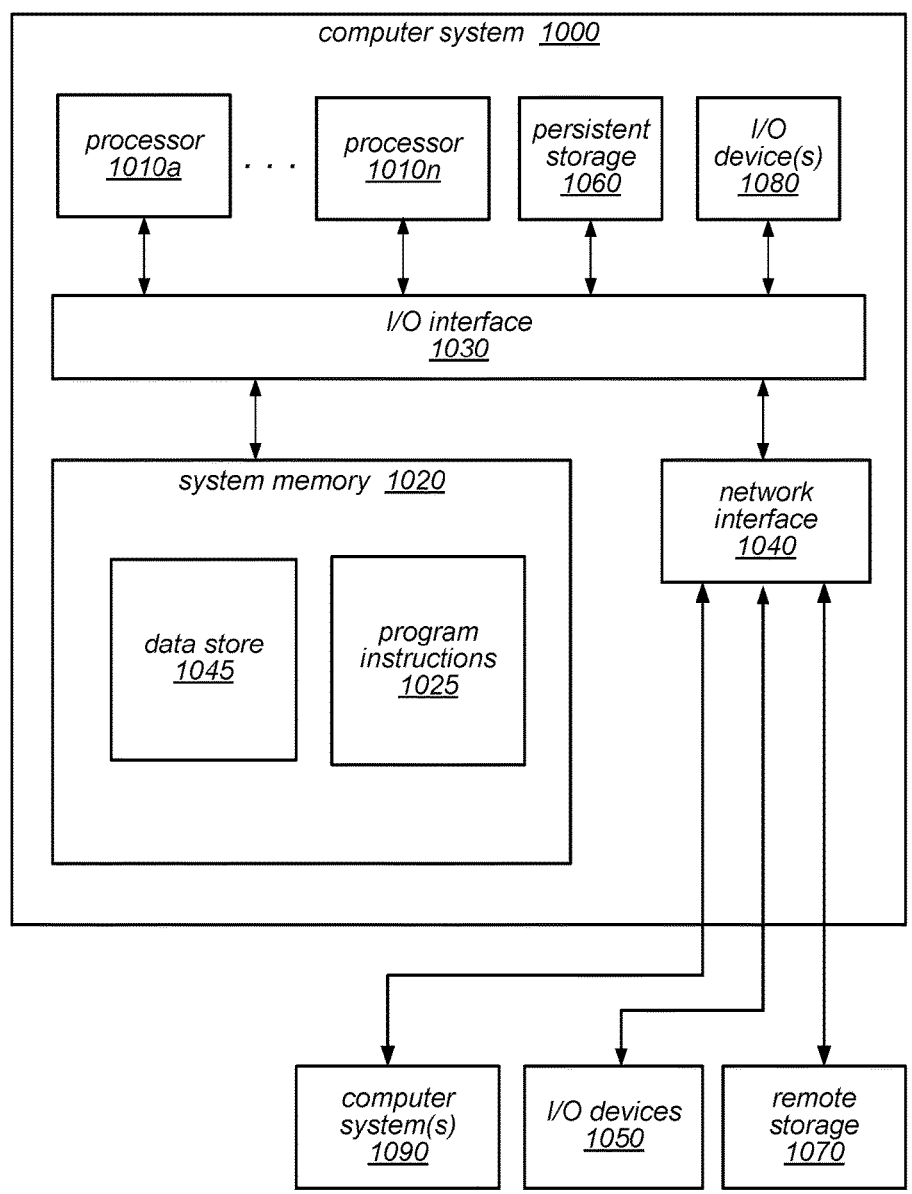
FIG. 10 is a block diagram illustrating an example computing system that may be used in at least some embodiments.

Embodiments of real time anomaly detection in data streams as described herein may be executed on one or more computer systems, which may interact with various other devices. FIG. 10 is a block diagram illustrating an example computer system, according to various embodiments. For example, computer system 1000 may be configured to implement storage and/or compute nodes of a compute cluster, a data stores, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, block-based storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a stream processing node, in different embodiments. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example.

Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090, for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a plurality of compute nodes, respectively comprising at least one processor and a memory, wherein the plurality of compute nodes implement a managed stream processing system that provides customizable stream processing functions for clients;
wherein the managed stream processing system is configured to:
provide a client interface for specifying one or more processing functions to be applied to one or more data streams;
receive a request via the client interface specifying a particular processing function to be applied to a particular data stream; and
configure one or more stream processing nodes of the managed stream processing system to apply the particular processing function to data records of the particular data stream as the data records are received at the one or more stream processing nodes.

2. The system of claim 1, wherein the one or more stream processing nodes are a plurality of stream processing nodes, and wherein the managed stream processing system is further configured to determine a workload distribution scheme for executing the particular processing function at the plurality of stream processing nodes.

3. The system of claim 1, wherein the particular processing function is received as part of a request from a client, and wherein the request further specifies a distributed configuration for applying the particular processing function among the one or more stream processing nodes.

4. The system of claim 1, wherein the particular processing function is received from a client, and wherein the managed stream processing system is further configured to:
- collect one or more performance metrics during the applying of the particular processing function to the data records of the particular data stream at the one or more stream processing nodes; and
- send the one or more performance metrics to the client.

5. The system of claim 4, wherein the managed stream processing system is further configured to:
- reconfigure the one or more stream processing nodes of the managed stream processing system to apply the particular processing function to data records of the particular data stream based, at least in part, on the one or more performance metrics.

6. The system of claim 1, wherein the particular processing function specifies that one or more operations are to be performed upon data records of another one or more data streams in addition to the data stream such that applying the particular processing function at the one or more stream processing nodes performs the one or more operations with respect to the data records of the additional one or more data streams.

7. The system of claim 6, wherein the one or more operations comprise an aggregation of attribute values from data records of the data stream and the additional one or more data streams.

8. A method, comprising:
- performing, by one or more compute nodes providing a managed stream processing system customizable stream processing functions for clients:
  - receiving a request via a client interface specifying a particular processing function to be applied to a particular data stream; and
  - configuring one or more stream processing nodes of the managed stream processing system to apply the particular processing function to data records of the particular data stream as the data records are received at the one or more stream processing nodes.

9. The method of claim 8, wherein the one or more stream processing nodes are a plurality of stream processing nodes, and wherein the method further comprises determining a workload distribution scheme for executing the particular processing function at the plurality of stream processing nodes.

10. The method of claim 8, wherein the particular processing function is received as part of a request from a client, and wherein the request further specifies a distributed configuration for applying the particular processing function among the one or more stream processing nodes.

11. The method of claim 8, wherein the particular processing function is received from a client, and wherein the method further comprises:
- collecting one or more performance metrics during the applying of the particular processing function to the data records of the particular data stream at the one or more stream processing nodes; and
- sending the one or more performance metrics to the client.

12. The method of claim 11, further comprising:
- reconfiguring the one or more stream processing nodes of the managed stream processing system to apply the particular processing function to data records of the particular data stream based, at least in part, on the one or more performance metrics.

13. The method of claim 8, wherein the particular processing function specifies that one or more operations are to be performed upon data records of another one or more data streams in addition to the data stream such that applying the particular processing function at the one or more stream processing nodes performs the one or more operations with respect to the data records of the additional one or more data streams.

14. The method of claim 13, wherein the one or more operations comprise an aggregation of attribute values from data records of the data stream and the additional one or more data streams.

15. One or more non-transitory computer-readable storage media storing program instructions that when executed on or across one or more processors cause the one or more computing devices to implement:
- performing, by one or more compute nodes providing a managed stream processing system customizable stream processing functions for clients:
  - receiving a request via a client interface specifying a particular processing function to be applied to a particular data stream; and
  - configuring one or more stream processing nodes of the managed stream processing system to apply the particular processing function to data records of the particular data stream as the data records are received at the one or more stream processing nodes.

16. The one or more non-transitory computer-readable storage media of claim 15, further storing program instructions that when executed on or across one or more processors cause the one or more computing devices to implement determining a workload distribution scheme for executing the particular processing function at a plurality of stream processing nodes, wherein the one or more stream processing nodes are the plurality of stream processing nodes.

17. The one or more non-transitory computer-readable storage media of claim 15, wherein the particular processing function is received as part of a request from a client, and wherein the request further specifies a distributed configuration for applying the particular processing function among the one or more stream processing nodes.

18. The one or more non-transitory computer-readable storage media of claim 15, further storing program instructions that when executed on or across one or more processors cause the one or more computing devices to implement:
- collecting one or more performance metrics during the applying of the particular processing function to the data records of the particular data stream at the one or more stream processing nodes; and
- sending the one or more performance metrics to a client;
- wherein the particular processing function is received from the client.

19. The one or more non-transitory computer-readable storage media of claim 18, further storing program instructions that when executed on or across one or more processors cause the one or more computing devices to implement:
- reconfiguring the one or more stream processing nodes of the managed stream processing system to apply the particular processing function to data records of the particular data stream based, at least in part, on the one or more performance metrics.

20. The one or more non-transitory computer-readable storage media of claim 15, wherein the particular processing function specifies that one or more operations are to be performed upon data records of another one or more data streams in addition to the data stream such that applying the particular processing function at the one or more stream processing nodes performs the one or more operations with respect to the data records of the additional one or more data streams.

* * * * *